United States Patent [19]

Yamada et al.

[11] Patent Number: 5,435,380
[45] Date of Patent: Jul. 25, 1995

[54] HEAT STORAGE APPARATUS AND METHOD

[75] Inventors: Akihiro Yamada, Hitachi; Makoto Shimoda, Katsuta; Akira Yamada, Hitachi; Yasuo Koseki, Hitachi ota; Yoshio Naganuma, Katsuta; Hideo Fukutake, Sagamihara; Toshihiro Fukuda, Tsurugashima, all of Japan

[73] Assignees: Hitachi, Ltd.; Hitachi Plant Engineering & Construction Co., Ltd., Tokyo, Japan

[21] Appl. No.: 179,683

[22] Filed: Jan. 11, 1994

[30] Foreign Application Priority Data

Jan. 12, 1993 [JP] Japan .................. 5-003104

[51] Int. Cl.$^6$ ............................. F28D 15/00
[52] U.S. Cl. ..................... 165/104.28; 165/104.19
[58] Field of Search ............. 165/104.13, 18, 104.19, 165/10, 902, 104.28

[56] References Cited

U.S. PATENT DOCUMENTS

| | | | |
|---|---|---|---|
| 4,067,237 | 1/1978 | Arcella | 165/104.19 |
| 4,213,563 | 7/1980 | van Kuijk | 165/104.19 |
| 4,366,807 | 1/1983 | Barber, Jr. | 165/104.19 |

FOREIGN PATENT DOCUMENTS

| | | |
|---|---|---|
| 0161236 | 6/1990 | Japan . |
| 1328245 | 11/1991 | Japan . |
| 2170483 | 2/1992 | Japan . |

OTHER PUBLICATIONS

Patent Abstracts of Japan, vol. 16, No. 253 (M-1263) 9 Jun. 1992 & JP-A-04 060 325 (Hitachi) 26 Feb. 1992—Abstract.
Patent Abstracts of Japan, vol. 13, No. 500 (M-891)(3848) 10 Nov. 1989 & JP-A-01 200 135 (Takashi) 11 Aug. 1989—Abstract.
Patent Abstracts of Japan, vol. 15, No. 13 (M-1069) 11 Jan. 1991 & JP-A-02 263 026 (Hitachi Plant) 25 Oct. 1990—Abstract.
Patent Abstracts of Japan, vol. 16, No. 107 (M-1222) 17 Mar. 1992 & JP-A-03 279 729 (Taikisha) 10 Dec. 1991—Abstract.
Patent Abstracts of Japan, vol. 8, No. 112 (M-298)(1549) 25 May 1984 & JP-A-59 021 930 (Kajima) 4 Feb. 1984—Abstract.

*Primary Examiner*—John Rivell
*Assistant Examiner*—Christopher Atkinson
*Attorney, Agent, or Firm*—Antonelli, Terry, Stout & Kraus

[57] ABSTRACT

A heat storage apparatus includes a tank containing a heat storage medium and having an upper region and a lower region for holding the heat storage medium at respective temperatures above and below atmospheric temperature. To reduce heat losses and increase flexibility of use, an intermediate region having heat storage medium is maintained in the tank between the upper and lower regions at a temperature between the upper and lower temperatures. The desired temperature of the intermediate region is maintained by heating or cooling its heat storage medium, for example by use of an otherwise unused low-grade heat source.

13 Claims, 9 Drawing Sheets

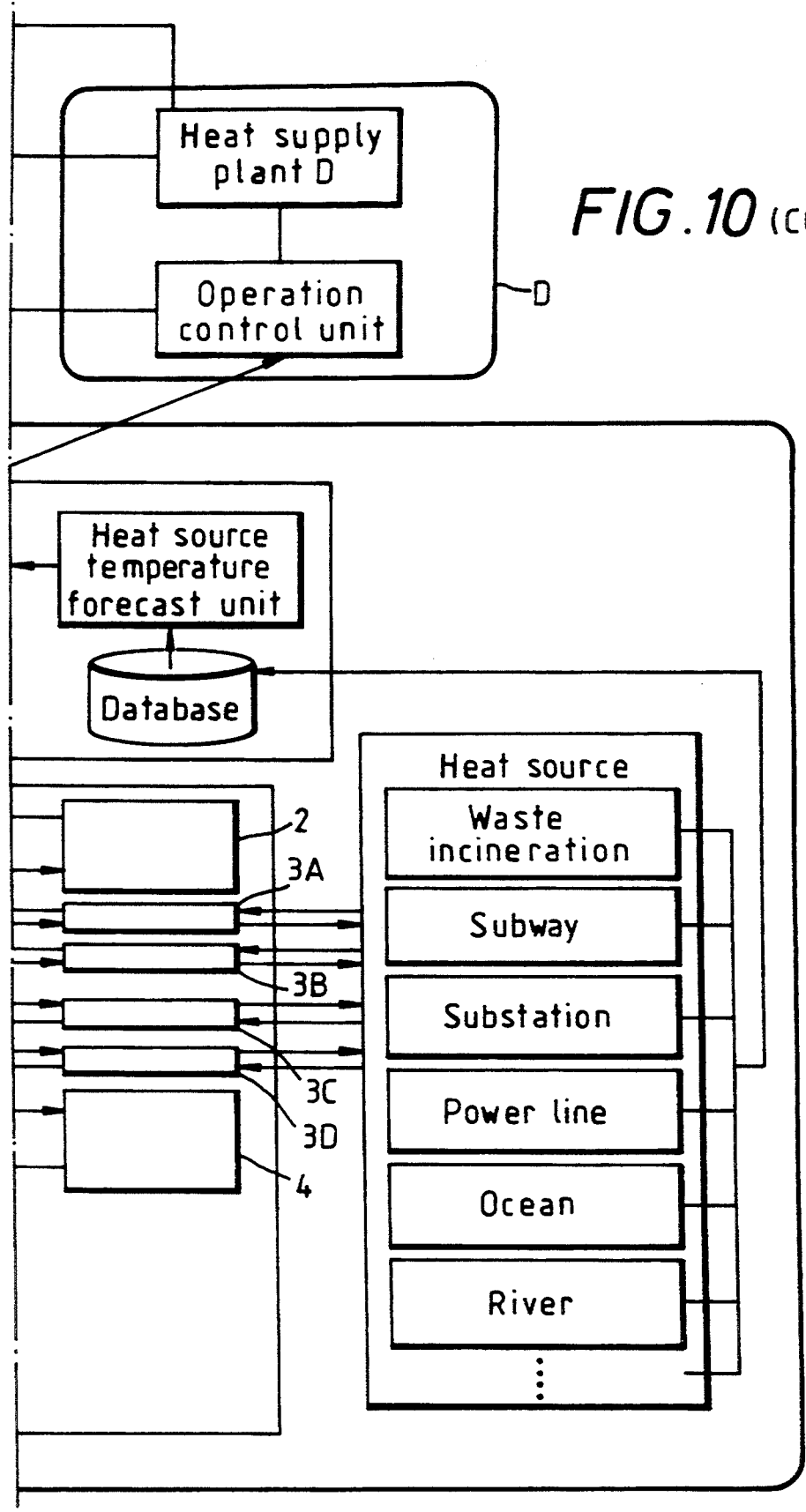
FIG. 10 (CONTD.)

HEAT STORAGE APPARATUS AND METHOD

BACKGROUND OF THE INVENTION

This invention relates to apparatus for and to a method of heat storage and, in particular to a method and apparatus in which bodies of heat storage medium at respective high and low temperatures are held in a tank with vertical separation due to their different densities. Such an apparatus and method may be used for example for bulk heat storage in a heating and cooling system for at least one building or a district.

JP-A-2-263026 describes apparatus, which employs a deep heat storage tank in an underground pit for storing high-temperature water at an upper section and low-temperature water at a lower section. A boundary float with apparent specific gravity set at a value half way between that of the hot and cold water is used to prevent heat transfer at the boundary between the hot and cold water.

JP-A-4-60325 describes heat storage using hot and cold water in a deep heat storage tank in an underground pit, storing in which high-temperature water (40° C.) is stored at an upper section and low-temperature water (5° C.) is stored at a lower section. To maintain the respective volumes of the hot and cold water, mixtures at 35° C. and 10° C., made by mixing hot water from the upper section of the tank and cold water from the lower section of the tank, are sent to a condenser and an evaporator respectively, of a heat pump. No float or other physical separator of the hot and cold water bodies is employed.

It is believed that systems as described in these prior art documents have not been built in practice. The operating costs of such systems increases when the volume of heat demand exceeds the amount of heat storage and creates a shortage of heat supply, for example, giving rise to a need to start a new heat output device to meet heat demand. This disadvantage particularly applies when the stored cold water, e.g. at 5° C., is heated to provide the needed hot water. Conversely, excess heat storage is wasted when heat demand is smaller than the amount of heat stored. Also, in the case of the system disclosed in JP-A-4-60325, equal amounts of the system disclosed in hot and cold water are produced, by operation of the heat pump.

Furthermore, in the arrangement of JP-A-4-60325, hot water at the upper section of the tank and cold water at the lower section of the tank are stored in direct contact with each other. In this case, heat transfer is significant due to the large temperature difference, thus lowering the heat storage efficiency. In other words, heat loss occurs because the area of mixing of hot water and cold water cannot be used.

A float system, such as shown in JP-A-2-263026, will be likely to increase the construction and maintenance costs.

SUMMARY OF THE INVENTION

An object of the present invention is to provide a heat storage apparatus and method that has high heat storage efficiency, can reduce heat losses and can cope with fluctuations in heat demand.

The present invention provides a heat storage apparatus and method in which at least one intermediate region of a heat storage medium at a temperature intermediate between the temperatures of the hot region and the cold region is provided. The temperature of this intermediate region is maintained by heating or cooling it as required.

A first advantage provided by the invention is that heat loss is reduced. The intermediate region separates the hot and cold regions, avoiding their direct contact, and thus reduces heat loss due to mixing of the regions at different temperatures. Secondly, the temperature difference between the intermediate region and the surroundings of the tank (e.g. ground or air) will be less than for the upper and lower regions, so that heat loss from the tank is reduced.

The invention can further provide a substantial advantage of a flexible response to heat load demand. For this purpose, the heat storage medium from the intermediate temperature region may be heated or cooled, e.g. to the temperature of the upper or lower region, and then supplied to the upper and lower region or supplied directly to the heat-load, e.g. a heat exchanger on the load side. Heating or cooling means to carry out this temperature transfer of the intermediate temperature medium can be the same as, or different from, heating or cooling means provided to maintain the temperature of the upper or lower regions.

It is possible to respond promptly to fluctuations in heat demand by performing heat supply through heating or cooling of an intermediate temperature heat storage medium, thereby permitting reduction of the volumes at high temperature and low temperature, reducing the overall volume of energy input, i.e. operating cost.

It is a further significant advantage of the invention that the temperature and volume of the intermediate region can be adapted to particular heat load demand conditions, and can be varied when the demand conditions change, e.g. between summer and winter.

Another advantage of the invention is that the heat requirements of the intermediate region (heating or cooling to maintain the desired temperature) may be met by an external source of heat (or cold) which may otherwise be unused or wasted, e.g. a source which is intermittently available or is of so-called low-grade heat. Examples are described below. Low-grade heat is available for example from an external medium which has a temperature between those of the upper and lower regions of the tank. Considerable economy in the operation can be achieved by this.

The heat storage medium may be, for example, water.

In referring here to atmospheric temperature, the generally prevailing atmospheric temperature is intended, which typically is in the range 10° to 30° C. and of course varies, and it is intended to ignore the more occasional atmospheric temperatures which may be below the temperature of the cold lower region of the tank (e.g. below 5° C.) or even above that of the hot upper region of the tank. While it is not a requirement of the invention, typical temperatures of the cold region of the tank are in the range 0° to 10° C. and typical of the upper region of the tank are in the range 35° to 60° C., more preferably 40° to 55° C. There will usually be some small temperature range in each region of the tank.

In this specification, and depending on the context, the expressions "heat" and "heat source" may refer also to "cool heat" and a source of "cool heat", e.g. a heat sink (such as the sea) or a heat pump removing thermal energy.

BRIEF DESCRIPTION OF THE DRAWINGS

Embodiments of the invention will now be described by way of non-limitative examples with reference to the accompanying drawings, in which.

DESCRIPTION OF THE PREFERRED EMBODIMENTS

Figure 1:
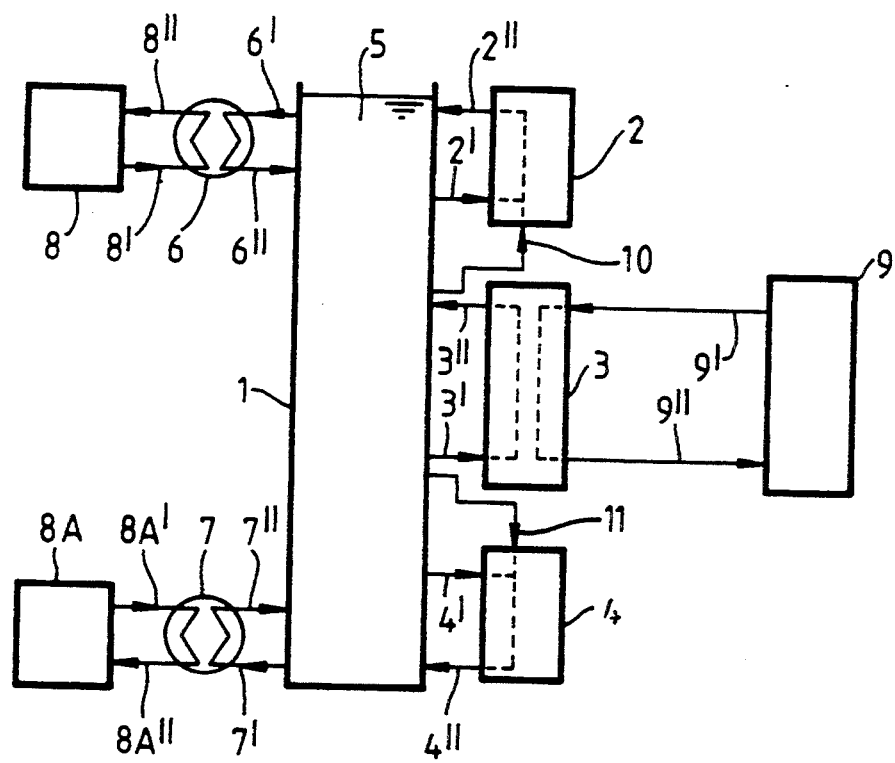
FIG. 1 is a diagram of a first bulk heat storage apparatus embodying the invention.

The first exemplary embodiment of the present invention is shown diagrammatically in FIG. 1, which shows a heat storage apparatus comprised of a large heat storage tank 1 containing a heat storage medium 5, a heating unit 2 for high-temperature heat storage, a heating unit 3 for intermediate-temperature heat storage, and a cooling unit 4 for low-temperature heat storage. The tank 1 is typically buried in the ground. The heat storage medium 5 is in this case water. Pipes $2^1$, $2^{11}$ connect a top region of the tank 1 to the heating unit 2 for transfer of medium 5 to and from the unit 2. Similarly, pipes $3^1$, $3^{11}$ are for transfer of medium 5 of an intermediate region of the tank to and from the heating unit 3, and pipes $4^1$, $4^{11}$ are for transfer of medium 5 at a bottom region of the tank to and from the cooling unit 4. Pipes 10 and 11 are provided for sending intermediate-temperature heat storage medium to the heating unit 2 and to the cooling unit 4, respectively. The heating unit 2, heating unit 3 and cooling unit 4 act to maintain the desired temperatures of the bodies of medium 5 at the upper, intermediate and lower regions of the tank as described below.

Heat storage medium 5 which is taken out via pipe $3^1$ from the vertically central intermediate region of the heat storage tank 1 is heated to an intermediate temperature range between that of the high-temperature medium and that of the low-temperature medium in the unit 3 by heat exchange with fluid from an external heat source 9 that has higher temperature than atmospheric temperature. Pipes $9^1$, $9^{11}$ transfer fluid between the source 9 and the unit 3. After heating in the unit 3, the medium 5 is returned to the tank 1 via pipe $3^{11}$ at a position higher than the position from which it was taken. In the alternative case (see FIG. 3 below) of cooling of the intermediate heat storage medium 5, the medium which is taken out from the central region of the tank 1 is cooled to an intermediate temperature range in the unit 3, which in this case acts as a cooling unit, using the external source 9 which in this case has a lower temperature than atmospheric temperature, i.e. is a cool heat source, and then is returned at a position lower than the position from which it was taken.

FIG. 1 also shows the load side of the apparatus. Via pipes $6^1$ and $6^{11}$, the higher temperature medium 5 is transferred to and from a heat exchanger 6 where it heats a heat load medium transferred to and from a heat-load or consumer device 8 via pipes $8^1$ and $8^{11}$. Similarly, a cold heat load or consumer device 8A is cooled by low-temperature medium through a heat exchanger 7 connected by pipes $7^1$, $7^{11}$ to the tank 1 and pipes $8A^1$, $8A^{11}$ to the device 8A.

The structure of FIG. 1 enables simultaneous heat storage of a body of high-temperature medium at an upper region, a body of intermediate-temperature medium at a middle region and a body of low-temperature medium at a lower region of the same tank, with density separation, and without the use of a float or other physical separator at the temperature boundaries. Furthermore, the intermediate-temperature medium can, as required, be heated or cooled by sending it to the heating unit 2 for high-temperature heat storage and to the cooling unit 4 for low-temperature heat storage via pipes 10 and 11. Although the intermediate heat storage medium itself is heated or cooled in this embodiment, another heat supply medium can be heated or cooled by using the intermediate-temperature heat storage medium as a heat source or a cooling source.

The following is an explanation of an example of the heat storage system of FIG. 1 in actual use as a heat storage tank for general air conditioning and hot water supply, with hot water at 50° C. and cold water at 5° C. Water is used as the heat storage medium 5.

Figure 2:
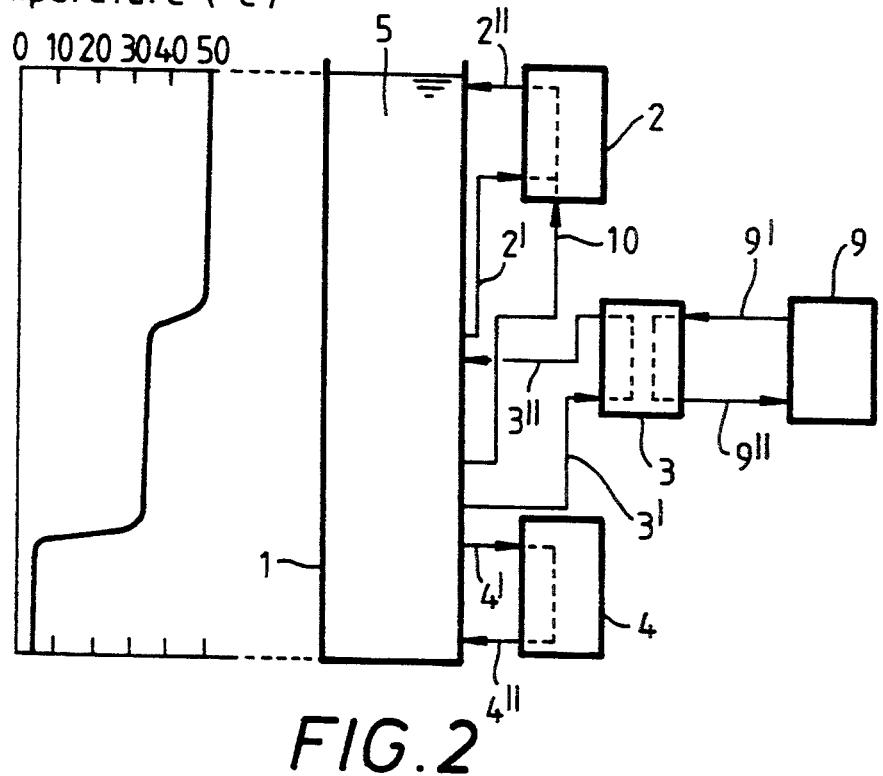
FIG. 2 is a diagram of a second embodiment of the invention, showing a typical temperature distribution in the tank in winter.

First, the heat storage operation is explained. In the winter season when heating demand is higher than cooling demand, water as heat storage medium 5 is taken out via pipe $3^1$ from a level of the tank 1 lower than the center and heated by the heating unit 3. This unit 3 may be a heat pump, but preferably uses an otherwise unused energy source 9 that has higher temperature than atmospheric temperature, for example various energy sources, such as a waste incineration plant, waste heat from a subway rail system, waste heat from power cables and waste heat from fuel cells, as well as waste heat from various other plants and sewage plants. The water is heated, for instance, from 25° C. to 35° C. A body of 35° C. hot water acts to store heat at the tank center, since the water is returned via pipe $3^{11}$ to a level above the tank center. Density differences ensure gravity separation of the bodies of water. FIG. 2 illustrates this process.

Figure 3:
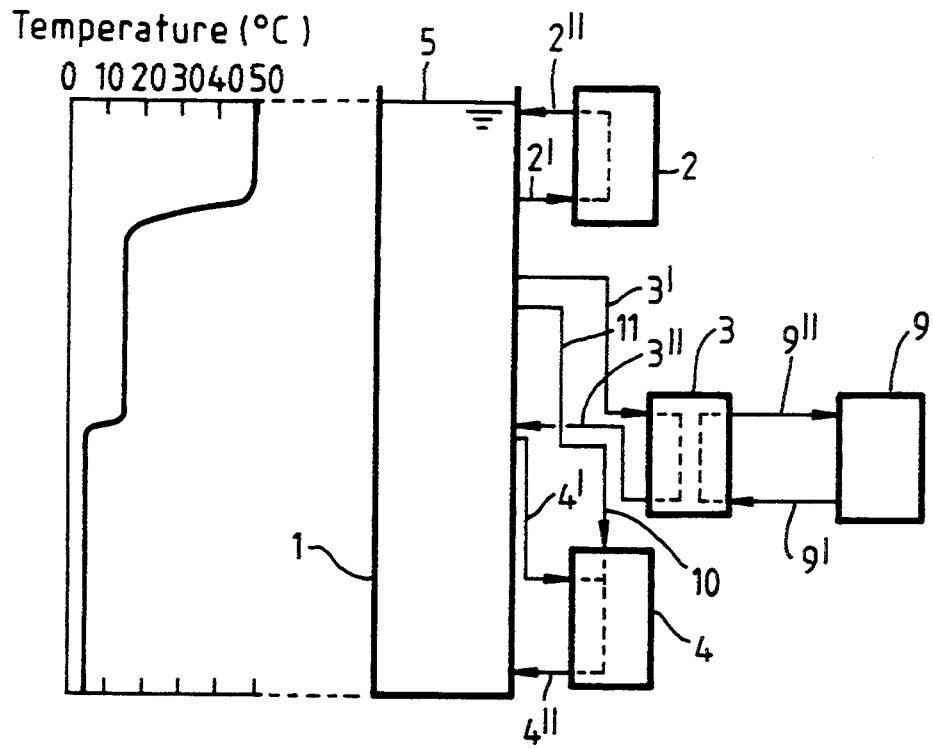
FIG. 3 is a diagram of a third embodiment of the invention, showing a typical summer temperature distribution.

By a corresponding process, in the summer season when cooling demand is higher than heating demand, an energy source that has a lower temperature than atmospheric temperature, such as river water or sea water, is used as an external cool heat source 9 to cool the unit 3. Cool water at 15° C. now stores cool heat at the tank center, due to cooling of the heat storage medium 5 which is taken out from a level above the tank center, cooled for instance from 25° C. to 15° C., and returned to a level lower than the tank center. FIG. 3 illustrates this process.

Further, heat is stored at an upper section of the tank 1 by using the heating unit 2 to heat the water to 50° C. which is the temperature for hot heat use, while heat is extracted at the lower section of the tank 1 by using the cooling unit 4 to cool the water to 5° C., which is the temperature for cool heat use.

Like the heating unit 3, the heating unit 2 and the cooling unit 4 can be heat pumps or heat exchangers using an external heat source, or may be conventional heaters or coolers.

In this way, storage of hot water at 50° C., intermediate-temperature water at 35° C. (15° C. in summer) and cool water at 5° C. can be performed simultaneously in the direction from top to bottom of the tank by using the difference in density resulting from difference in temperature.

FIG. 2 shows an embodiment similar to that of FIG. 1, with locations of the pipe connections specially adapted for winter conditions, and shows graphically an example of the temperature distribution inside the tank when the winter heat storage described above is completed; while, FIG. 3 shows an embodiment similar to that of FIG. 1 with pipe locations specially adapted for summer conditions and shows an example of the temperature distribution inside the tank when the summer heat storage described above is completed. As shown by FIG. 2 or FIG. 3, the percentage of hot heat storage can be increased in winter and the percentage of cold heat storage can be increased in summer by adjusting the positions for extracting and returning the water in winter and summer. Further, the temperature difference between high-temperature water and intermediate-temperature water, or between low-temperature water and intermediate-temperature water can be reduced by changing the temperature of intermediate-temperature water in winter and summer, thereby reducing the flow of heat energy through heat transfer. In FIGS. 2 and 3 the load side connections shown in FIG. 1 are omitted, for clarity.

Next, a heat release operation is described, with reference to FIG. 1.

During heat release, 50° C. hot water is taken out from an upper region of the tank and hot heat is supplied to the heat-load or consumer device 8 via the heat exchanger 6. Similarly, 5° C. cold water is taken out from a lower region of the tank and cold heat is supplied to the consumer device 8A via the low-temperature heat exchanger 7.

Further, in the event of a shortage of hot heat (e.g. 50° C.) in winter, hot heat can be supplied by extracting water at the intermediate temperature (e.g. 35° C.) through the pipe 10 and heating it to 50° C. in the heating unit 2. Similarly, in the event of a shortage of cold heat (e.g. 5° C.) in summer, cold heat can be supplied by extracting water at an intermediate temperature (e.g. 15° C.) through the pipe 11 and cooling it to 5° C. in the cooling unit 4.

Thus, a heat storage system of the present invention can effectively utilize an otherwise unused energy source, which may be a low-grade energy source, and performs heat storage of hot water (e.g. 50° C.) and cold water (e.g. 5° C. ) at temperatures intended for use (e.g. 50° C. and 5° C., respectively), as well as water in the intermediate temperature range between the two (e.g. 35° C., 15° C.) within the same tank. It has superior energy-saving properties and economic efficiency.

The body of medium 5 at intermediate temperature stores heat at the tank center by using the difference in density resulting from the difference in temperature to prevent direct contact between hot water and cold water at temperatures intended for use. Therefore, heat storage efficiency is improved, because the temperature difference which serves as the driving force for heat transfer between the hot water and the cold water is reduced. In addition, heat loss from the tank wall is small in proportion to the storage being performed at an intermediate temperature, which has a relatively small temperature difference with the ambient temperature around the tank.

Further, flexible measures can be taken against fluctuations in heat demand by using the heat storage medium at an intermediate temperature as a heat source for heat release. Accordingly, the operating cost can be reduced as the heat storage volume of hot water and cold water can be kept at a minimum level.

A float or other insulator is not employed in the tank, to provide insulation, but if desired such a device may be used.

Moreover, the economic efficiency of the system may be further improved by using an electric heat pump as the heating unit 2 and the cooling unit 4 in the heat storage system of the present invention and by storing heat through the use of inexpensive night-rate electricity.

Further embodiments of the invention will now be described, with reference to other Figures, in which the same reference numbers indicate corresponding parts, which will not be described again except to explain differences.

Figure 4:
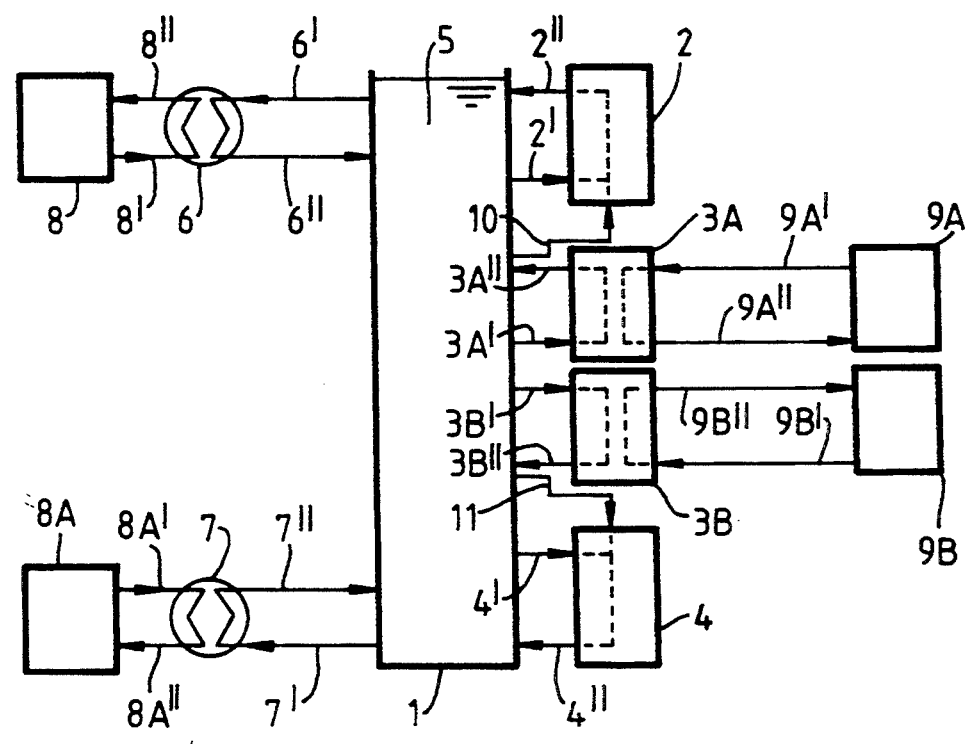
FIG. 4 is a diagram of a fourth embodiment of the invention.

FIG. 4 shows an embodiment of the present invention which is equipped with a heating unit 3A for intermediate-temperature heat storage connected by pipes $3A^1$, $3A^{11}$ to the tank using an external heat source 9A, connected by pipes $9A^1$, $9A^{11}$, which has a temperature higher than atmospheric temperature. The construction also has a cooling unit 3B for intermediate-temperature heat storage, connected to the tank by pipes $3B^1$, $3B^{11}$, using an external heat source 9B of temperature lower than atmospheric as a cooling source, connected by pipes $9B^1$, $9B^{11}$. As described above, heat storage is performed by heating or cooling to 35° C. or 15° C. through the heating unit 3A and cooling unit 3B. An example of temperature distribution inside the tank is shown for the similar embodiment of FIG. 5, in which some of the pipe locations on the tank 1 are adapted. As in FIGS. 1 to 3, supply of hot heat and cold heat can be adjusted simultaneously by heating the heat storage medium at intermediate temperature (35° C.) through the heating unit 2, or by cooling medium at 15° C. through the cooling unit 4 according to fluctuations in hot and cold heat demand.

Figure 6:
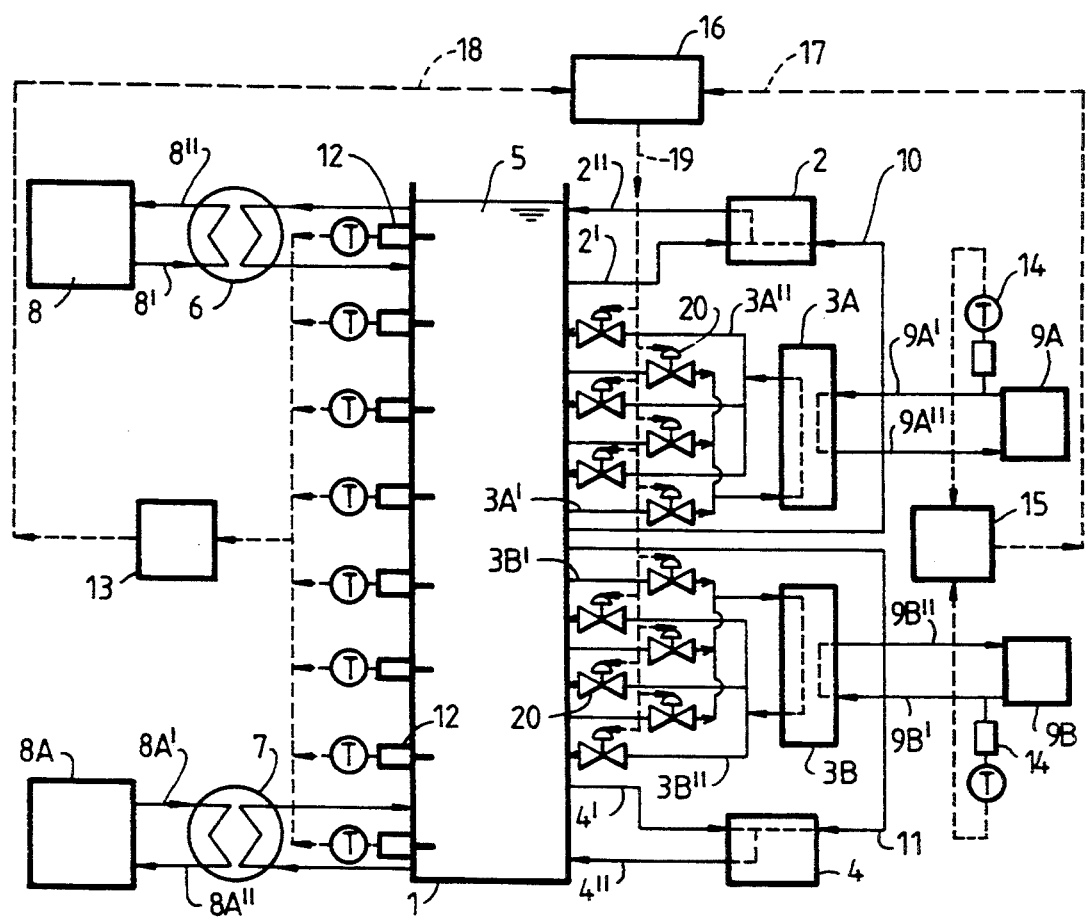
FIGS. 6 to 9 are diagrams showing respectively further embodiments of the invention.

FIG. 6 shows another embodiment of the present invention, in which the heat storage tank 1 has plural openings installed for extracting and returning the heat storage medium 5 and a plurality of temperature sensors 12 spaced in the tank depth direction for measuring temperature in the tank. In effect, each of the lines $3A^1$, $3A^{11}$, $3B^1$, $3B^{11}$ of FIG. 4 is subdivided into three lines connected to the tank 1 at different levels. In addition, it is equipped with temperature distribution measurement means 13 which obtains temperature distribution in the tank 1 from the sensors 12, a heat source temperature measurement means 15 which has temperature sensors 14 for measuring the temperature of external heat sources 9A and 9B, and a heat storage position determination means 16 which determines suitable positions for extracting heat storage medium and returning it to the heat storage tank according to the temperature distribution inside the tank and the external heat source temperatures that have been measured.

The temperature distribution measurement means 13 obtains the temperature distribution inside the tank from the sensors 12 and outputs the results to the heat storage position determination means 16 via line 18. The heat source temperature measurement means 15 measures the temperature of external heat sources 9A and 9B through the sensors 14 and outputs the measurement results via line 17 to the position determination means 16.

The position determination means 16 determines the water entry temperature so that this apparatus will be operating most efficiently in accordance with mechanical specifications of the heating unit 3A and a cooling unit 3B (e.g. water entry temperature, hot heat source temperature, cooling source temperature). Then it determines the position of an extraction opening (pipe $3A^1$ or $3B^1$) where the heat storage medium with the closest temperature to the determined water entry temperature exists. In addition, it determines the position of a return opening (pipe $3A^{11}$ or $3B^{11}$) where the heat storage medium with the closest temperature for heating or cooling in the unit 3A or the unit 3B exists. It outputs a valve control signal 19 so that the operation will be performed at the selected extraction opening or return opening and controls flow control valves 20 that are installed in each extraction pipe and return pipe.

Incidentally, extraction openings or return openings for the heat storage medium can either be installed in numbers as shown in FIG. 6 or equivalent means may be provided by inserting one or more movable pipes from the top of the tank. Further, the tank temperature sensors can be either a plurality of local temperature measurement sensors such as thermocouples spaced vertically, or continuous temperature measurement means with an optical fiber cable.

Figure 7:
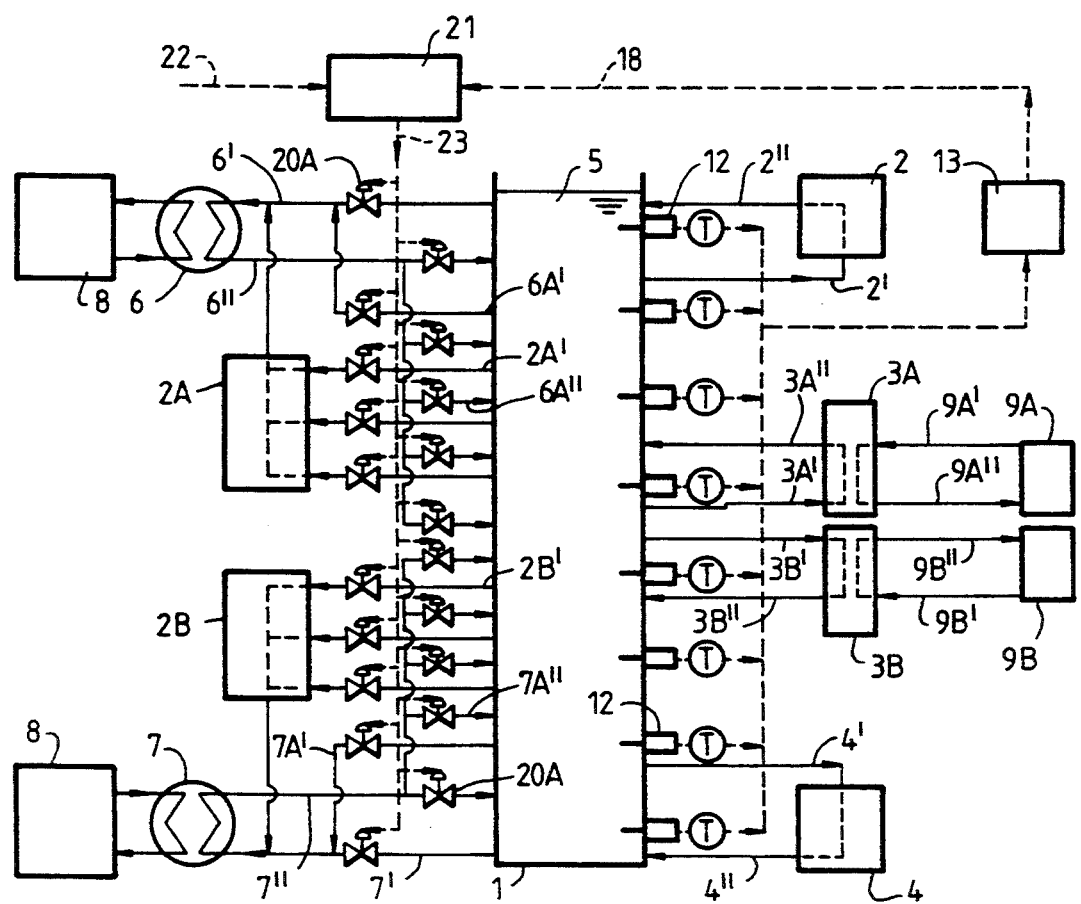

FIG. 7 shows another embodiment of the present invention. This is similar to the embodiment of FIG. 4 but the pipes 10 and 11 are absent and there are a plurality of vertically spaced heat storage medium extraction pipes $6^1$, $6A^1$, $2A^1$, $2B^1$, $7A^1$, $7^1$ and return pipes $6^{11}$, $6A^{11}$, $7A^{11}$, $7^{11}$ for heat release on the heat storage tank 1, a plurality of temperature sensors 12 which are spaced over the tank depth, a tank temperature distribution measurement means 13 which obtains the temperature distribution inside the tank from the temperature measured by the sensors 12, and a heat release position determination means 21 which determines the medium extraction openings and return openings during heat release, from the measured temperature distribution and the temperature and heat quantity that are being used by the consumers.

The position determination means 21 receives information via line 22 on temperature and heat quantity being used by consumers and receives a temperature distribution signal which is output from measurement means 13 and determines the heat release temperature and flow rate that are suitable for temperature and heat quantity that are being used by the consumer. After determining the position of the extraction opening where the heat storage medium has a temperature closest to the determined heat release temperature, the flow rate control valves on each extraction piping are controlled by outputting a valve control signal 23. The pipes $6^1$, $6A^1$, $7A^1$, $7^1$ are connected directly to the heat exchangers 6 and 7. On the other hand, the pipes $2A^1$ are connected to a heating unit 2A and the pipes $2B^1$ to a cooling unit 2B, so that the apparatus can overcome a heat storage shortage by heating or cooling the intermediate-temperature heat storage medium using the heating unit 2A or the cooling unit 2B.

Figure 8:
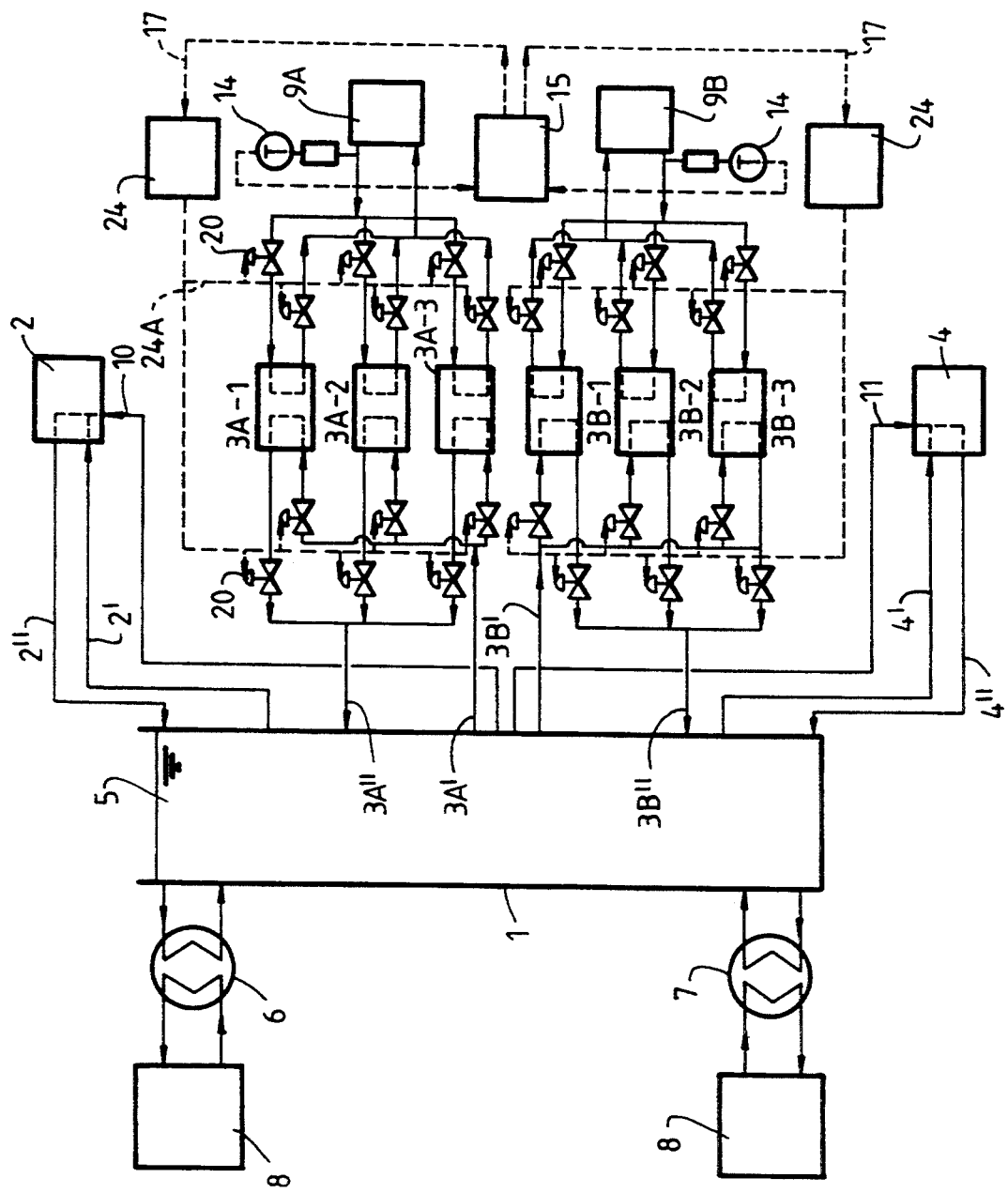

FIG. 8 shows an embodiment of the present invention equipped with three heating units 3A-1, 3A-2, 3A-3, and three cooling units 3B-1, 3B-2, 3B-3 having different specifications for intermediate-temperature heat storage. There is a heat source temperature measurement means 15 with sensors 14 for measuring the temperature of external heat sources 9A and 9B. Selection means 24 determines which of the three heating units 3A or three cooling units 3B is operated. Heat pumps, for instance, can be used as such units with different specifications.

The selection means 24 receives via line 17 the temperature of the external heat sources, 9A, 9B, such as unused energy sources and selects the model that operates in the most efficient manner for heating or cooling the heat storage medium to the predetermined temperature. The result of selection is output as a valve control signal 24A which, in turn, controls flow rate valves 20 in the pipes to use the selected heating or cooling unit.

Figure 5:
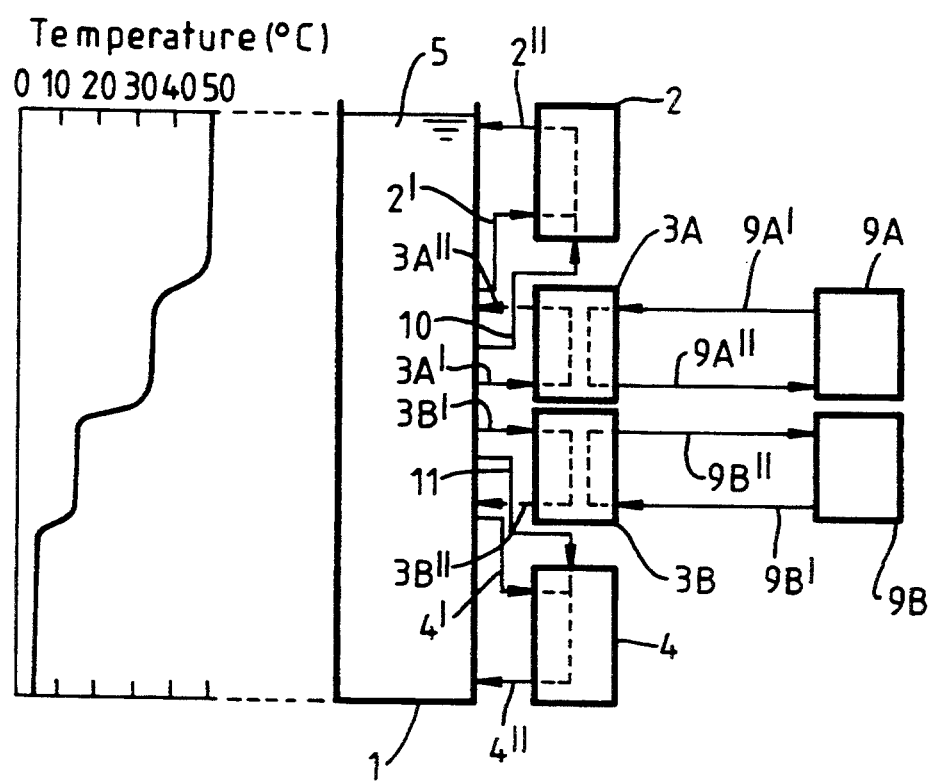
FIG. 5 is a diagram of another embodiment, similar to that of FIG. 4, and showing a temperature distribution in the tank.
Figure 9:
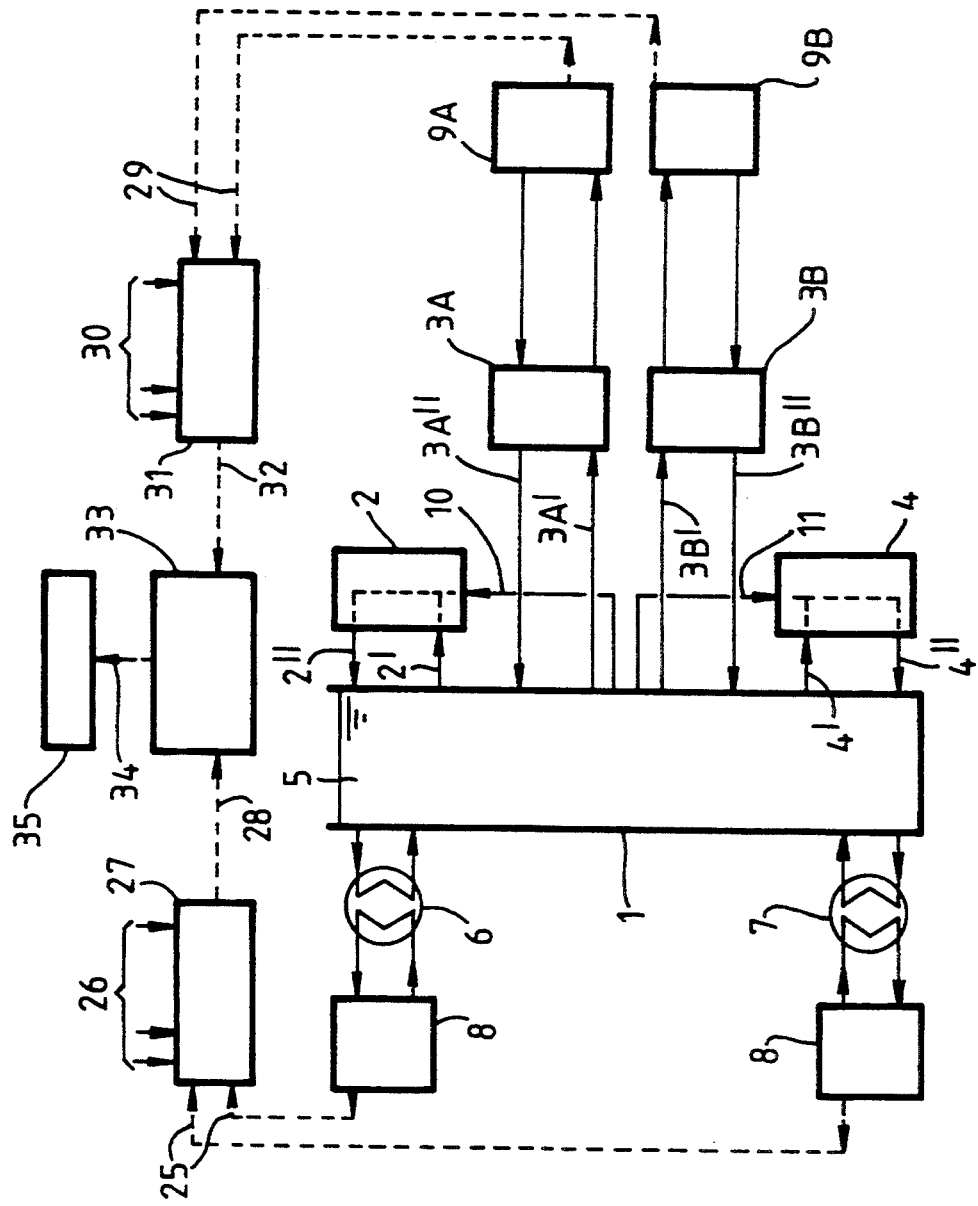

FIG. 9 shows an embodiment of the present invention similar to those of FIGS. 4 and 5 with a demand forecast means 27 for forecasting the future heat demand of the consumers, a heat source heat quantity forecast means 31 for forecasting the future heat quantity of an external heat source, a heat storage/heat release planning means 33 for drafting a heat storage/heat release plan from the results of demand forecast, and heat source heat quantity forecast and a display unit 35 which displays this heat storage/heat release plan.

The demand forecast means 27 has the function of incorporating consumer demand result data 25, atmospheric information, such as temperature, humidity, insulation and climate, and various information for demand forecast 26, including status of activities unique to the consumer, such as meetings, events and production plan, and storing this information as a database. Based on past accumulated information, statistical techniques, such as regression analysis and a method of studying demand trend through a neural network, may be used, to obtain a demand forecast result 28 by forecasting heat demand for the following day, on an hourly basis, for instance.

The heat source heat quantity forecast means 31 has a function of incorporating heat source temperature results data 29 of external heat sources, such as an unused energy source, and various information for heat quantity forecast 30, including atmospheric information and phenomena unique to a heat source, and storing this information as a database. Based on past accumulated information, it forecasts future heat quantity fluctuations of external heat sources 9A and 9B by using the same method as a demand forecast means 27, outputs a heat quantity forecast result 32.

A heat storage/heat release planning means 33 incorporates a demand forecast result 28 and a heat quantity forecast result of external heat source 32 and determines a heat storage/heat release plan, including a time and temperature of heat storage/heat release, and an apparatus and a type of external heat source to be used to minimize the cost of operation.

An example of an actual determining method is a method for solving a combination optimization problem in order to minimize or maximize the evaluation function that was determined through the use of a mathematical planning method, such as linear programming and dynamic planning (e.g. to minimize operating cost).

A detailed explanation concerning the method of operation planning for a heat source apparatus including the heat storage tank is omitted here because it is described in the "Optimization Plan for Cogeneration" by Koichi Ito and Ryohei Yokoyama, published by Sangyo Tosho, Inc.

Following preparation, heat storage/heat release plan results 34 are sent to a display unit 35, such as a display screen at a monitor and control room and a monitor screen for an operator, and are displayed as operation guidance. Graphs indicating temperature distribution inside the heat storage tank, the results of a heat demand forecast and the changes in heat demand results up to the present, as well as graphs on heat source heat quantity forecast results and changes in heat source heat quantity up to the present, are also displayed.

In addition to use as guidance for operators, operation planning results 34 can be converted into a control signal for a heat source apparatus for on-line control of the apparatus.

Figure 10:
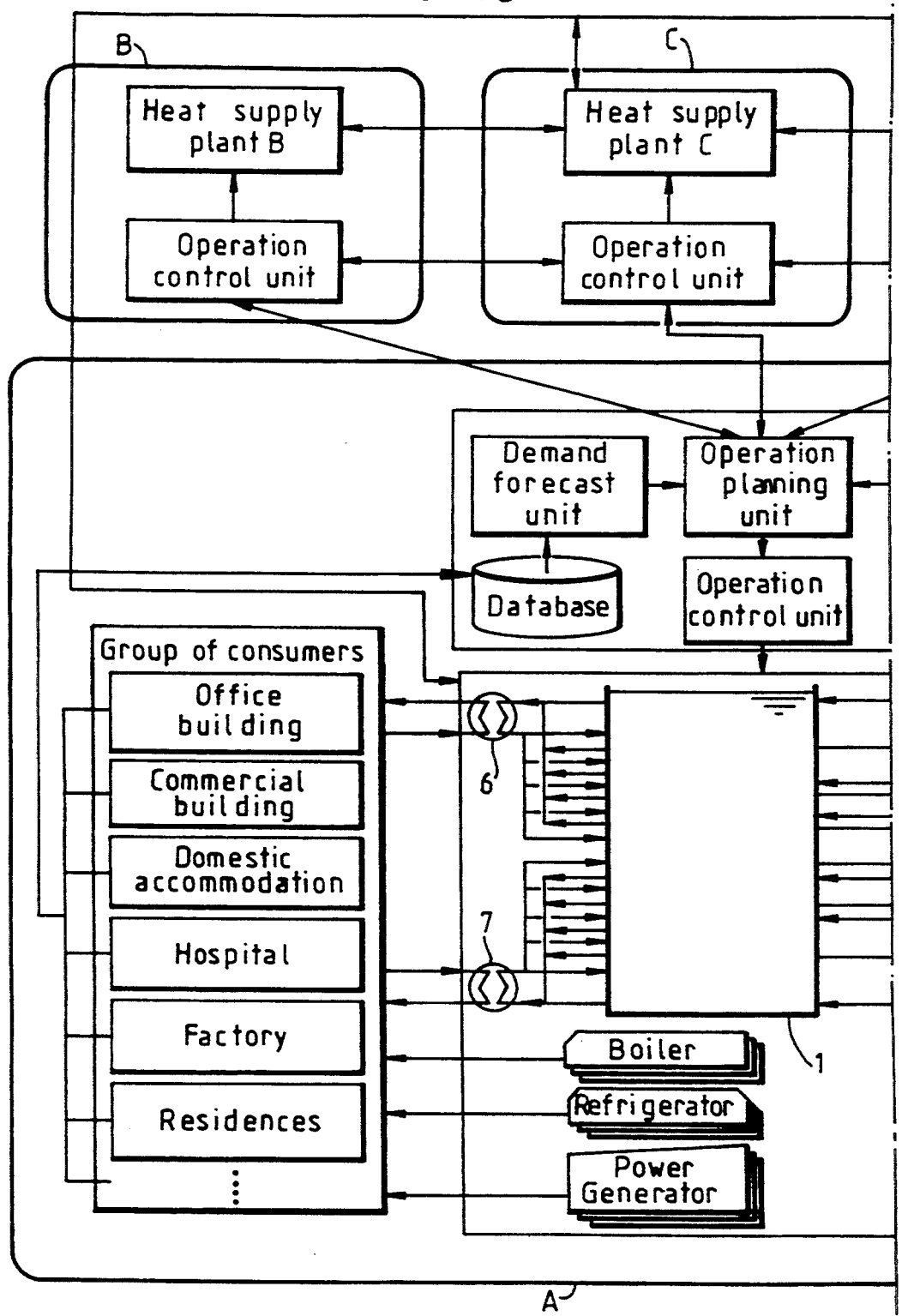
FIG. 10 is a diagram showing application of the invention in a regional heating and cooling system.

FIG. 10 shows an embodiment in which the heat storage system of the present invention is applied to a regional air conditioning system that supplies hot heat and cool heat to be used for air conditioning, hot water supply and factory utilities. The area supplied is divided into four regions A, B, C and D, each having a heat supply plant equipped with a heat storage apparatus using a heat storage tank as discussed above, a boiler, a heat pump, a freezer and a power generator. Also shown within the region A are various types of consumers, including office buildings, commercial buildings, accommodation facilities, hospitals, factories, detached housing and housing complexes. At the heat supply plant, information unique to each consumer, such as the number of room reservations at an accommodation facility, an event schedule at a commercial building and a production plan at a factory, is stored in a database in addition to general information, such as demand results and atmospheric information, for an hourly forecast of the changes in heat demand on the following day by using a method such as regression analysis and a method of studying a demand trend through a neural network.

Meanwhile, a heat supply plant uses as its heat source, and cooling source unused heat sources such as waste heat from waste incineration, waste heat from subways, waste heat from substations and heat held by rivers and oceans.

Unused heat sources include those whose usable temperature and heat quantity change depending on the season, such as rivers and oceans, and those whose usable time is limited to a certain period of time such as waste heat from subways and waste incineration. Information unique to a heat source, such as the volume of waste processed, the type of waste and the operation plan for waste heat from waste incineration, is stored in a database in addition to general information, such as past results of unused heat source temperature and heat quantity and atmospheric information, for an hourly forecast of temperature and heat quantity for each heat source on the following day by using a heat source temperature forecast unit.

The operation plan for the following day is prepared based on the demand forecast results and heat source temperature/heat quantity forecast results by using a mathematical planning method and knowledge processing to minimize the operating cost. The operation plan results are converted into a control signal for a heat source apparatus by the operation control unit.

Heat supply plants in respective regions are linked via a telephone line or an information transmitting means and via piping that can send and receive hot heat and cold heat. It is also possible to mutually communicate demand forecast results and heat source temperature/heat quantity forecast results of other regions via information transmitting means to draft heat storage/heat release plans and plans for supplying heat to other regions that are most efficient for Regions A through D as a whole.

While the invention has been illustrated by various embodiments, it is not limited to these embodiments and includes many other embodiments, variations and modifications within its scope.

What is claimed is:

1. A heat storage apparatus comprising:
 (a) a tank containing a heat storage medium and having an upper region for holding a first body of said heat storage medium at a first temperature above-atmospheric temperature, a lower region for holding a second body of said heat storage medium at a second temperature below atmospheric temperature and an intermediate region between said upper and lower region for holding at least a third body of said heat storage medium at a third temperature between said first and second temperatures, with said first, second and third bodies of heat store medium being maintained as separated by their respective densities;
 (b) means for maintaining a desired temperature of at least one of said first and second bodies of heat storage medium comprising at least one of means for heating the heat storage medium of said first body and means for cooling the heat storage medium of said second bodies;
 (c) means for maintaining a desired temperature of said third body of heat storage medium, selected from means for heating said heat storage medium of said third body and means for cooling said heat storage medium of said third body; and
 (d) at least one of means for transferring heat storage medium from said intermediate region to said upper region and for heating the heat storage medium so transferred to said first temperature, and means for transferring heat storage medium from said intermediate region to said lower region and for cooling heat storage medium so transferred to said second temperature.

2. A heat storage apparatus according to claim 1, wherein said means for maintaining a desired temperature of said third body comprises heat-exchanging means for affecting heat exchange between said heat storage medium and a further medium having a temperature between said third temperature and one of said first and second temperatures.

3. A heat storage apparatus according to claim 1, having load-side heat exchanging mean for effecting heat exchange between said heat storage medium at one of said first and second temperatures and a heat-load medium, and means for transferring said heat storage medium from said intermediate region to said load-side heat exchanging means, including temperature-changing means for changing the temperature of the heat storage medium so transferred.

4. A heat storage apparatus according to claim 1 having means for measuring the temperature of said heat storage medium at a plurality of locations at different heights in said tank, means for extracting said heat storage medium from said tank at a plurality of locations at different heights of said tank and for effecting heat exchange of said heat storage medium so extracted with a heat-load medium, and means for selecting a location for extraction of said heat storage medium from said tank in dependence on a heat-load demand on said heat storage apparatus and measured temperatures in said tank.

5. A heat storage apparatus according to claim 1, wherein said heat transfer means comprises at least 1 heat transferred device for effecting heat exchange between said heat storage medium and said external medium, and means for selecting one of said heat transfer devices in dependence on the temperature of said external medium.

6. A heat storage apparatus according to claim 1, wherein said means for maintaining said heat storage medium at said intermediate temperature comprises means for transferring heat between said heat storage medium at said intermediate region and a plurality of external heat sources, and said heat storage apparatus further has means for forecasting at least one of heat quantity and temperature of said external heat sources, means for forecasting heat-load demand on said heat storage apparatus, and means for establishing a heat storage plan relating to heat storage temperature in said tank, a time of heat exchange with said external heat sources and a selection of said external heat sources for heat exchange.

7. A heat storage apparatus according to claim 1 having means for forecasting future heat-load demand on said heat storage apparatus and means for establishing an operating plan for said heat storage apparatus relating to a heat release quantity and time for said upper and lower regions of said tank, a quantity and time of temperature raising and lowering of heat storage medium removed from said intermediate region, and a quantity and time of heat supply for maintaining said intermediate temperature of said intermediate region.

8. A heat storage system having at least one heat storage apparatus according to claim 1, and further including means for establishing a plan for heat storage and release therefor on the basis of a forecast heat-load demand on said system.

9. A method of heat storage, comprising the steps of (a) holding in a tank upper, lower and intermediate regions of a heat storage medium having respectively upper, lower and intermediate temperatures, at which said heat storage medium has different densities, (b) extracting heat storage medium from said intermediate region, changing its temperature and supplying it to at least one of an external heat-load and one of said upper and lower regions, and (c) maintaining said intermediate temperature of said intermediate region by at least one of heating and cooling said heat storage medium therein.

10. A method according to claim 9, wherein said step (b) comprises heating said heat storage medium extracted from said intermediate region and supplying it to said upper region.

11. A method according to claim 9, wherein said step (b) comprises cooling said heat storage medium extracted from said intermediate region and supplying it to said lower region.

12. A method according to claim 9, wherein said step (c) comprises effecting heat exchange between said heat storage medium of said intermediate region and an external medium.

13. A method according to claim 12, wherein said external medium has a temperature between said upper temperature and said lower temperature.

* * * * *